United States Patent
Seidel et al.

(10) Patent No.: US 6,939,905 B2
(45) Date of Patent: Sep. 6, 2005

(54) FLAME-RESISTANT POLYCARBONATE MOLDING COMPOUNDS FOR EXTRUSION APPLICATIONS

(75) Inventors: Andreas Seidel, Dormagen (DE); Thomas Eckel, Dormagen (DE); Bernd Keller, Geldern (DE); Dieter Wittmann, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 238 days.

(21) Appl. No.: 10/220,591

(22) PCT Filed: Feb. 21, 2001

(86) PCT No.: PCT/EP01/01924

§ 371 (c)(1),
(2), (4) Date: Sep. 3, 2002

(87) PCT Pub. No.: WO01/66634

PCT Pub. Date: Sep. 13, 2001

(65) Prior Publication Data

US 2003/0092805 A1 May 15, 2003

(30) Foreign Application Priority Data

Mar. 6, 2000 (DE) .......................... 100 10 943
Mar. 24, 2000 (DE) .......................... 100 14 608

(51) Int. Cl.$^7$ ............................................. C08K 5/523
(52) U.S. Cl. ....................... 524/127; 524/140; 524/141; 524/145
(58) Field of Search .................... 524/127, 140–141, 524/145

(56) References Cited

U.S. PATENT DOCUMENTS

| | | | | |
|---|---|---|---|---|
| 4,094,856 A | * | 6/1978 | Guschl | 524/122 |
| 4,868,235 A | * | 9/1989 | Muehlbach et al. | 524/252 |
| 5,061,745 A | | 10/1991 | Wittmann et al. | 524/139 |
| 5,204,394 A | | 4/1993 | Gosen et al. | 524/125 |
| 5,276,066 A | * | 1/1994 | Paulik et al. | 521/108 |
| 5,621,029 A | | 4/1997 | Eckel et al. | 524/127 |
| 5,672,645 A | | 9/1997 | Eckel et al. | 524/127 |
| 5,717,021 A | * | 2/1998 | Huang et al. | 524/484 |
| 5,750,602 A | | 5/1998 | Köhler et al. | 524/127 |
| 5,849,827 A | | 12/1998 | Bödiger et al. | 521/423 |
| 5,864,004 A | * | 1/1999 | Kim et al. | 524/142 |
| 5,871,570 A | * | 2/1999 | Koyama et al. | 106/18.18 |
| 5,952,408 A | * | 9/1999 | Lee et al. | 524/127 |
| 5,994,463 A | * | 11/1999 | Eckel et al. | 525/67 |
| 6,093,759 A | * | 7/2000 | Gareiss et al. | 524/122 |
| 6,174,943 B1 | * | 1/2001 | Matsumoto et al. | 524/115 |
| 6,518,336 B1 | * | 2/2003 | Yabuhara et al. | 524/116 |
| 6,613,820 B2 | * | 9/2003 | Fujiguchi et al. | 524/109 |

FOREIGN PATENT DOCUMENTS

| | | |
|---|---|---|
| DE | 19 742 868 | 4/1999 |
| EP | 0 767 204 * | 9/1997 |
| EP | 0 869 150 | 10/1998 |
| JP | 11-199768 | 7/1999 |
| WO | 99/07778 | 2/1999 |
| WO | 99/57198 | 11/1999 |

* cited by examiner

*Primary Examiner*—Peter Szekely
(74) *Attorney, Agent, or Firm*—Joseph C. Gil; Aron Preis

(57) ABSTRACT

A molding composition characterized by its improved processability and flame resistance, suitable especially for extrusion is disclosed. The composition that contains polycarbonate, an impact modifier and a halogen-free phosphous-containing flameproofing agent features flame resistance of V-0 in the UL 94 V fire behavior test at wall thickness ≦1.5 mm and a melt viscosity, measured at 260° C. and a shear rate of 100 s$^1$, of ≧600 Pa s

13 Claims, No Drawings

FLAME-RESISTANT POLYCARBONATE MOLDING COMPOUNDS FOR EXTRUSION APPLICATIONS

The present invention relates to chlorine- and bromine-free, impact-resistant modified polycarbonate compositions which have a high melt viscosity and melt stability and accordingly are suitable for processing by extrusion, and which are distinguished by excellent flame resistance combined with good ESC behaviour and mechanical properties, and by high dimensional stability under heat.

Chlorine- and bromine-free flame-retarded, impact-resistant modified polycarbonate moulding compositions are known.

EP-A 0 345 522 (U.S. Pat. No. 5,061,745) describes, for example, polymer mixtures of aromatic polycarbonate, ABS graft polymer and/or styrene-containing copolymer which have been rendered flame-resistant with monophosphoric acid esters.

U.S. Pat. Nos. 5,204,394 and 5,672,645 describe PC/ABS moulding compositions which have been rendered flame-resistant by oligophosphoric acid esters or mixtures of oligo- and mono-phosphoric acid esters.

The PC/ABS blends according to the above-mentioned prior art containing both mono- and oligo-phosphoric acid esters are distinguished, as compared with comparable blends which are not flame-retarded, by greatly reduced dimensional stability under heat and, above all, by a greatly reduced melt viscosity. The latter is advantageous for processing by injection moulding, which is the method mainly used at present for such moulding compositions, since processing at lower temperatures is possible and shorter cycle times can be achieved as a result. For processing of the moulding compositions by extrusion, the low melt viscosities prove to be problematic and the resulting melt stabilities prove to be inadequate for preventing premature breaking off of the profile under conventional processing conditions. That is the case especially of moulding compositions which are required to have excellent flame resistance even at small wall thicknesses, which requires the use of large amounts of the plasticising flameproofing agent. Improving the flame resistance generally leads in the described systems to a reduction in melt stability. In particular, it proves difficult to achieve good flame resistance and high melt stability combined with a high level of strength, since the latter requires the use of significant amounts of impact modifiers, such as, for example, SAN-grafted polybutadiene rubber, which stand in the way of flame-resistant treatment of the blend owing to their high flammability.

JP-A 111 997 68 describes PC/ABS blends which have been rendered flame-resistant with monomeric and oligomeric phosphoric acid esters, the flame resistance being markedly improved by the addition of an inorganic filler, such as, for example, talc. The reduction in the phosphate content that can be achieved thereby, without a change in flame resistance, is, however, not sufficient to achieve the melt viscosities necessary for extrusion applications. Furthermore, the inorganic filler generally has an adverse effect on the mechanical properties, especially on the strength of the polymer blend.

U.S. Pat. No. 5,849,827 and WO 99/07782 describe PC/ABS moulding compositions which have been rendered flame-resistant with resorcinol-based or bisphenol A-based oligophosphate, the afterburning times being markedly reduced by the addition of nano-scale inorganic materials in small concentrations. However, the melt stability of the moulding compositions described therein is not sufficient for extrusion applications.

WO 99/57198 describes PC/ABS moulding compositions which have been rendered flame-resistant with an oligophosphate derived from resorcinol and which are distinguished by a very low Teflon content of only 0.1 wt. %—corresponding to a fluorine content of 0.076%. Linear and branched polycarbonates having a high molecular weight (31,000 and 32,000 g/mol) are used in the moulding compositions. The Theological properties of the described moulding compositions (MVR) permit processing by extrusion. However, the moulding compositions are distinguished by a weakness in the ESC behaviour and in the dimensional stability under heat, especially when sufficient flameproofing agent is used to achieve adequate flame resistance even in the case of thin wall thicknesses.

Accordingly, the object of the present invention was to provide a chlorine- and bromine-free moulding composition which is distinguished by excellent flame resistance even in the case of thin wall thicknesses, by good mechanical properties and by an improved ESC behaviour, and which can be processed by extrusion owing to its high melt stability.

It has now been found that impact-resistant modified polycarbonate compositions containing high molecular weight linear or branched polycarbonates, which have been rendered flame-resistant with halogen-free phosphorus compounds and preferably contain also a fluorinated polyolefin in a concentration of $\geq 0.15$ wt. %, based on the total composition, meet the desired properties profile and additionally exhibit excellent dimensional stability under heat.

Accordingly, the present invention provides polycarbonate moulding compositions which pass the UL94 V fire behaviour test with a rating of V-0 at wall thicknesses $\leq 1.5$ mm, which have a melt viscosity, measured at 260° C. and a shear rate of 100 $s^{-1}$, of $\geq 600$ Pa s, preferably $\geq 800$ Pa s, particularly preferably $\geq 1000$ Pa s, and which contain A) at least one high molecular weight linear or branched aromatic polycarbonate or polyester carbonate, B) at least one impact modifier, and C) at least one halogen-free phosphorus compound.

The compositions may additionally contain

D) a fluorinated polyolefinic compound,

E) an inorganic material,

F) a further polymer component, and

G) conventional polymer additives, such as, for example, anti-dripping agents, lubricants and mould-release agents, nucleating agents, antistatics, stabilisers, colouring agents and pigments.

Preferred moulding compositions contain

A) from 60 to 98 parts by weight, preferably from 70 to 95 parts by weight, particularly preferably from 75 to 90 parts by weight, of at least one linear or branched aromatic polycarbonate, preferably such a polycarbonate having a relative solution viscosity of $\geq 1.30$ (measured at 25° C. in methylene chloride and in a concentration of 0.5 g/100 ml), B) from 0.5 to 30 parts by weight, preferably from 1 to 15 parts by weight, particularly preferably from 2 to 10 parts by weight, of at least one graft polymer having a rubber base, C) from 1 to 20 parts by weight, preferably from 2 to 15 parts by weight, especially from 3 to 12 parts by weight, of an oligomeric phosphoric acid ester, D) from 0.15 to 1 part by weight, particularly preferably from 0.2 to 0.5 part by weight, of a fluorinated polyolefin, and E) from 0 to 5 parts by weight, preferably from 0 to 3 parts by weight, especially from 0 to 1.5 parts by weight, of a finely divided inorganic material in particulate, flake or fibrous form, the sum of the parts by weight of all the components (A to E and, optionally, further constituents) being 100.

Component A

Aromatic polycarbonates and/or aromatic polyester carbonates according to component A which are suitable according to the invention are known in the literature or can be prepared by processes which are known in the literature (for the preparation of aromatic polycarbonates see, for example, Schnell, "Chemistry and Physics of Polycarbonates", Interscience Publishers, 1964 and DE-A 1 495 626, DE-A 2 232 877, DE-A 2 703 376, DE-AOS 2 714 544, DE-A 3 000 610, DE-A 3 832 396; for the preparation of aromatic polyester carbonates see, for example, DE-A 3 077 934).

The preparation of aromatic polycarbonates is carried out, for example, by reacting diphenols with carbonic acid halides, preferably phosgene, and/or with aromatic di-carboxylic acid dihalides, preferably benzenedicarboxylic acid dihalides, by the phase boundary process, optionally using chain terminators, for example monophenols, and optionally using branching agents having a functionality of three or more, for example triphenols or tetraphenols.

Diphenols for the preparation of aromatic polycarbonates and/or aromatic polyester carbonates are preferably those of formula (I)

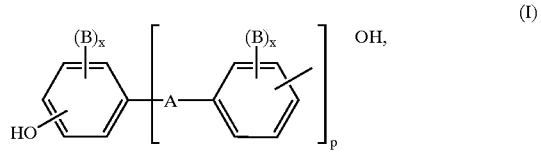

(I)

wherein

A represents a single bond, $C_1$–$C_5$-alkylene, $C_2$–$C_5$-alkylidene, $C_5$–$C_6$-cycloalkylidene, —O—, —SO—, —CO—, —S—, —SO$_2$—, $C_6$–$C_{12}$-arylene, to which there may be condensed other aromatic rings optionally containing hetero atoms, or a radical of formula (II) or (III)

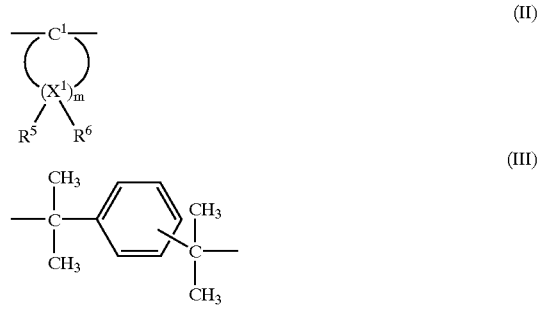

each of the substituents B represents $C_1$–$C_{12}$-alkyl, preferably methyl, x are each independently of the other 0, 1 or 2, p represents 1 or 0, and $R^5$ and $R^6$ can be selected individually for each $X^1$ and are each independently of the other hydrogen or $C_1$–$C_6$-alkyl, preferably hydrogen, methyl or ethyl, $X^1$ represents carbon, and m represents an integer from 4 to 7, preferably 4 or 5, with the proviso that at least one atom $X^1$, $R^5$ and $R^6$ are simultaneously alkyl Preferred diphenols are hydroquinone, resorcinol, dihydroxydiphenols, bis-(hydroxyphenyl)-$C_1$-$C_5$-alkanes, bis-(hydroxyphenyl)-$C_5$-$C_6$-cycloalkanes, bis-(hydroxyphenyl) ethers, bis-(hydroxyphenyl) sulfoxides, bis-(hydroxyphenyl) ketones, bis-(hydroxyphenyl)-sulfones and α,α-bis-(hydroxyphenyl)-diisopropylbenzenes.

Particularly preferred diphenols are 4,4'-dihydroxydiphenyl, bisphenol A, 2,4-bis-(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-di-hydroxydiphenyl-sulfone.

Special preference is given to 2,2-bis-(4-hydroxyphenyl)-propane (bisphenol A).

The diphenols may be used individually or in the form of any desired mixtures.

The diphenols are known in the literature or obtainable by processes known in the literature.

Suitable chain terminators for the preparation of thermoplastic aromatic polycarbonates are, for example, phenol and p-tert.-butylphenol, as well as long-chained alkylphenols, such as 4-(1,3-tetramethylbutyl)-phenol according to DE-A 2 842 005 or monoalkylphenols or dialkylphenols having a total of from 8 to 20 carbon atoms in the alkyl substituents, such as 3,5-di-tert.-butylphenol, p-isooctylphenol, p-tert.-octylphenol, p-dodecylphenol and 2-(3,5-dimethylheptyl)-phenol and 4-(3,5-dimethylheptyl)-phenol. The amount of chain terminators to be used is generally from 0.5 mol % to 10 mol %, based on the molar sum of the diphenols used in a particular case.

The thermoplastic aromatic polycarbonates may be branched in a known manner, preferably by the incorporation of from 0.05 to 2.0 mol %, based on the sum of the diphenols used, of compounds having a functionality of three or more, for example compounds having three or more phenolic groups.

Both homopolycarbonates and copolycarbonates are suitable. For the preparation of copolycarbonates according to component A according to the invention, from 1 to 25 wt. %, preferably from 2.5 to 25 wt. % (based on the total amount of diphenols to be used) of polydiorganosiloxanes having hydroxy-aryloxy terminal groups may also be used. Those compounds are known (see, for example, U.S. Pat. No. 3,419,634) or can be prepared by processes known in the literature. The preparation of copolycarbonates containing polydiorganosiloxanes is described, for example, in DE-A 3 334 782.

In addition to the homopolycarbonates of bisphenol A, preferred polycarbonates are the copolycarbonates of bisphenol A containing up to 15 mol %, based on the molar sum of diphenols, of diphenols other than those mentioned as being preferred or particularly preferred.

Aromatic dicarboxylic acid dihalides for the preparation of aromatic polyester carbonates are preferably the diacid dichlorides of isophthalic acid, terephthalic acid, diphenyl ether 4,4'-dicarboxylic acid and naphthalene-2,6-dicarboxylic acid.

Special preference is given to mixtures of the diacid dichlorides of isophthalic acid and terephthalic acid in a ratio of from 1:20 to 20:1.

In the preparation of polyester carbonates, a carbonic acid halide, preferably phosgene, is additionally used concomitantly as bifunctional acid derivative.

In addition to the monophenols already mentioned, there come into consideration as chain terminators for the preparation of the aromatic polyester carbonates also the chlorocarbonic acid esters of the mentioned monophenols and the acid chlorides of aromatic monocarboxylic acids, which may optionally be substituted by $C_1$–$C_{22}$-alkyl groups, as well as aliphatic $C_2$–$C_{22}$-monocarboxylic acid chlorides.

The amount of chain terminators is in each case from 0.1 to 10 mol %, based in the case of phenolic chain terminators on moles of diphenols and in the case of mono-carboxylic acid chloride chain terminators on moles of dicarboxylic acid dichlorides.

The aromatic polyester carbonates may also contain aromatic hydroxycarboxylic acids incorporated therein.

The aromatic polyester carbonates may be either linear or branched in a known manner (see in that connection also DE-A 2 940 024 and DE-A 3 007 934).

There may be used as branching agents, for example, carboxylic acid chlorides having a functionality of three or more, such as trimesic acid trichloride, cyanuric acid trichloride, 3,3'-,4,4'-benzophenone-tetracarboxylic acid tetrachloride, 1,4,5,8-naphthalenetetracarboxylic acid tetrachloride or pyromellitic acid tetrachloride, in amounts of from 0.01 to 1.0 mol % (based on dicarboxylic acid dichlorides used), or phenols having a functionality of three or more, such as phloroglucinol, 4,6-dimethyl-2,4,6-tri-(4-hydroxyphenyl)-heptene, 2,4,4-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis(4-hydroxyphenyl)-cyclohexyl]-propane, 2,4-bis(4-hydroxyphenyl-isopropyl)-phenol, tetra-(4-hydroxyphenyl)-methane, 2,6-bis(2-hydroxy-5-methyl-benzyl)-4-methylphenol, 2-(4-hydroxyphenyl)-2-(2,4-dihydroxyphenyl)-propane, tetra-(4-[4-hydroxyphenyl-isopropyl]-phenoxy)-methane, 1,4-bis[4,4'-dihydroxy-triphenyl)-methyl]-benzene, in amounts of from 0.01 to 1.0 mol %, based on diphenols used. Phenolic branching agents can be used initially with the diphenols, acid chloride branching agents can be introduced together with the acid dichlorides.

The content of carbonate structural units in the thermoplastic aromatic polyester carbonates can vary as desired. The carbonate group content is preferably up to 100 mol %, especially up to 80 mol %, more especially up to 50 mol %, based on the sum of ester groups and carbonate groups. Both the esters and the carbonates contained in the aromatic polyester carbonates can be present in the polycondensation product in the form of blocks or in a randomly distributed manner.

The relative solution viscosity ($\eta_{rel}$) of the aromatic polycarbonates and polyester carbonates is in the range of from 1.18 to 1.4 (measured on solutions of 0.5 g of polycarbonate or polyester carbonate in 100 ml of methylene chloride solution at 25° C.). The polycarbonates and polyester carbonates used in the moulding compositions according to the invention are preferably those having a relative solution viscosity of $\geq 1.30$.

The thermoplastic aromatic polycarbonates and polyester carbonates may be used alone or in any desired mixture.

Component B

Component B consists of one or more graft polymers of

B.1 from 5 to 95 wt. %, preferably from 30 to 90 wt. %, of at least one vinyl monomer with B.2 from 95 to 5 wt. %, preferably from 70 to 10 wt. %, of one or more graft bases having glass transition temperatures <10° C., preferably <0° C., particularly preferably <–20° C.

The graft base B.2 generally has a mean particle size ($d_{50}$ value) of from 0.05 to 10 µm, preferably from 0.1 to 5 µm, especially from 0.2 to 1 µm.

Monomers B. 1 are preferably a mixture of

B.1.1 from 50 to 99 parts by weight of vinyl aromatic compounds and/or vinyl aromatic compounds substituted at the nucleus (such as, for example and preferably, styrene, α-methylstyrene, p-methylstyrene) and/or methacrylic acid ($C_1$–$C_8$)-allyl esters (such as, for example and preferably, methyl methacrylate, ethyl methacrylate), and B.1.2 from 1 to 50 parts by weight of vinyl cyanides (unsaturated nitriles, such as, for example and preferably, acrylonitrile and methacrylonitrile) and/or (meth)acrylic acid ($C_1$–$C_8$)-alkyl esters (such as, for example and preferably, methyl methacrylate, n-butyl acrylate, tert.-butyl acrylate) and/or derivatives (such as, for example and preferably, anhydrides and imides) of unsaturated carboxylic acids (for example and preferably maleic anhydride and/or N-phenyl maleimide).

Preferred monomers B.1.1 are selected from at least one of the monomers styrene, α-methylstyrene and methyl methacrylate; preferred monomers B.1.2 are selected from at least one of the monomers acrylonitrile, maleic anhydride and methyl methacrylate.

Particularly preferred monomers are B.1.1 styrene and B.1.2 acrylonitrile.

Suitable graft bases B.2 for the graft polymers B are, for example, diene rubbers, EP(D)M rubbers, that is to say those based on ethylene/propylene and optionally diene, as well as acrylate, polyurethane, silicone and ethylene/vinyl acetate rubbers.

Preferred graft bases B.2 are diene rubbers (for example based on butadiene, isoprene, etc.) or mixtures of diene rubbers or copolymers of diene rubbers or mixtures thereof with other copolymerisable monomers (for example according to B.1.1 and B.1.2), with the proviso that the glass transition temperature of component B.2 is <10° C., preferably <0° C., particularly preferably <–10° C.

Special preference is given to pure polybutadiene rubber.

Particularly preferred polymers B are ABS polymers (emulsion, mass and suspension ABS), as are described, for example, in DE-A 2 035 390 (=U.S. Pat. No. 3,644,574) or in DE-A 2 248 242 (=GB-A 1 409 275) or in Ullmann, Enzyklopädie der Technischen Chemie, Vol. 19 (1980), p. 280 ff. The gel content of the graft base B.2 is at least 30 wt. %, preferably at least 40 wt. % (measured in toluene).

The graft copolymers B are prepared by free-radical polymerisation, for example by emulsion, suspension, solution or mass polymerisation, preferably by emulsion or mass polymerisation.

Emulsion ABS is particularly preferred as component B.

Especially suitable graft rubbers are also those ABS polymers which are prepared by redox initiation using an initiator system of organic hydroperoxide and ascorbic acid according to U.S. Pat. No. 4,937,285.

Suitable acrylate rubbers according to B.2 for the polymers B are preferably polymers of acrylic acid alkyl esters, optionally with up to 40 wt. %, based on B.2, of other polymerisable, ethylenically unsaturated monomers. The preferred polymerisable acrylic acid esters include $C_1$–$C_8$-alkyl esters, for example methyl, ethyl, butyl, n-octyl and 2-ethylhexyl esters as well as mixtures of those monomers.

For crosslinking, monomers having more than one polymerisable double bond can be copolymerised. Preferred examples of crosslinking monomers are esters of unsaturated monocarboxylic acids having from 3 to 8 carbon atoms and of unsaturated monohydric alcohols having from 3 to 12 carbon atoms, or of saturated polyols having from 2 to 4 OH groups and from 2 to 20 carbon atoms, such as, for example, ethylene glycol dimethacrylate, allyl methacrylate; polyunsaturated heterocyclic compounds, such as, for example, trivinyl and triallyl cyanurate; polyfunctional vinyl compounds, such as di- and tri-vinylbenzenes; and also triallyl phosphate and diallyl phthalate.

Preferred crosslinking monomers are allyl methacrylate, ethylene glycol di-methacrylate, diallyl phthalate and heterocyclic compounds having at least three ethylenically unsaturated groups.

Particularly preferred crosslinking monomers are the cyclic monomers triallyl cyanurate, triallyl isocyanurate, triacryloylhexahydro-s-triazine, triallyl benzenes. The amount of crosslinking monomers is preferably from 0.02 to 5 wt. %, especially from 0.05 to 2 wt. %, based on the graft base B.2.

In the case of cyclic crosslinking monomers having at least three ethylenically unsaturated groups, it is advantageous to limit the amount to less than 1 wt. % of the graft base B.2.

Preferred "other" polymerisable, ethylenically unsaturated monomers which can optionally be used, in addition to the acrylic acid esters, for the preparation of the graft base B.2 are, for example, acrylonitrile, styrene, α-methylstyrene, acrylamides, vinyl $C_1$–$C_6$-alkyl ethers, methyl methacrylate, butadiene. Preferred acrylate rubbers as graft base B.2 are emulsion polymers having a gel content of at least 60 wt. %.

Other suitable graft bases according to B.2 are silicone rubbers having graft-active sites, as are described in DE-A 3 704 657, DE-A 3 704 655, DE-A 3 631 540 and DE-A 3 631 539.

The gel content of the graft base B.2 is determined at 25° C. in a suitable solvent (M. Hoffmann, H. Krömer, R. Kuhn, Polymeranalytik I und II, Georg Thieme-Ver-lag, Stuttgart 1977).

The mean particle size $d_{50}$ is the diameter above and below which in each case 50 wt. % of the particles lie. It can be determined by means of ultracentrifuge measurement (W. Scholtan, H. Lange, Kolloid, Z. und Z. Polymere 250 (1972), 782–1796).

Component C

The moulding compositions according to the invention contain as flameproofing agent (C) a phosphorus compound of the general formula (IV)

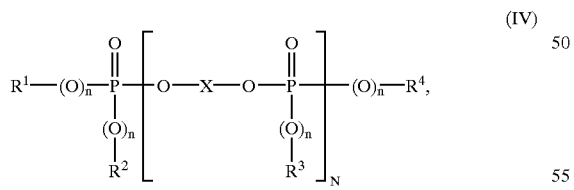

wherein
$R^1$, $R^2$, $R^3$ and $R^4$ are each independently of the others $C_1$- to $C_8$-alkyl, or $C_5$- to $C_6$-cycloalkyl, $C_6$- to $C_{20}$-aryl or $C_7$- to $C_{12}$-aralkyl each optionally substituted by alkyl, preferably $C_1$-$C_4$-alkyl,
the substituents n are each independently of the others 0 or 1,
N represents a number from 0.1 to 30,
X represents a mono- or poly-nuclear aromatic radical having from 6 to 30 carbon atoms, or a linear or branched aliphatic radical having from 2 to 30 carbon atoms which may be OH-substituted and contain up to 8 ether bonds.

$R^1$, $R^2$, $R^3$ and $R^4$ are each independently of the others preferably $C_1$–$C_4$-alkyl, phenyl, naphthyl or phenyl-$C_1$–$C_4$-alkyl. The aromatic groups $R^1$, $R^2$, $R^3$ and $R^4$ may in turn be substituted by alkyl groups, preferably $C_1$–$C_4$-alkyl. Particularly preferred aryl radicals are cresyl, phenyl, xylenyl, propylphenyl or butylphenyl.

X in formula (IV) preferably represents a mono- or poly-nuclear aromatic radical having from 6 to 30 carbon atoms. It is preferably derived from diphenols of formula (I).

n in formula (IV) is preferably 1.

N may have values from 0.1 to 30, with values of from 0.5 to 10, especially from 0.7 to 5, being preferred. Mixtures of different phosphates according to formula (IV) may also be used as component C according to the invention. In that case, N may have the above-mentioned values as average values. The mixtures may also contain monophosphorus compounds (N=0).

Monophosphorus compounds of formula (IV) are especially tributyl phosphate, triphenyl phosphate, tricresyl phosphate, diphenylcresyl phosphate, diphenyloctyl phosphate, diphenyl-2-ethylcresyl phosphate, tri-(isopropylphenyl) phosphate, methylphosphonic acid dimethyl esters, methylphosphonic acid diphenyl esters, phenylphosphonic acid diethyl esters, triphenylphosphine oxide or tricresylphosphine oxide. A particularly preferred monophosphorus compound is triphenyl phosphate.

The mean N values may be determined by determining the composition of the phosphate mixture (molecular weight distribution) by a suitable method (gas chromatography (GC), high pressure liquid chromatography (HPLC), gel permeation chromatography (GPC)) and calculating the mean values of N therefrom.

X represents especially

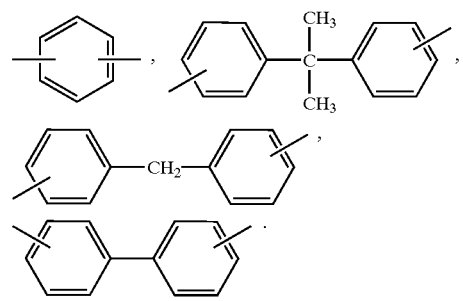

It has proved especially advantageous to use phosphorus compounds of the general formula (V)

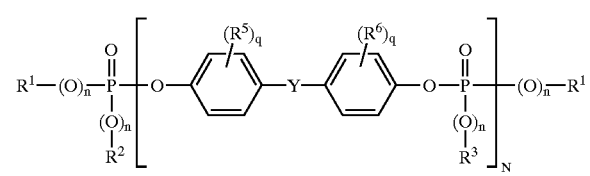

wherein
$R^1$, $R^2$, $R^3$ an $R^4$ are each independently of the others $C_1$–$C_8$-alkyl and/or optionally alkyl-substituted $C_5$–$C_6$-cycloalkyl, $C_6$–$C_{10}$-aryl or $C_7$–$C_{12}$-aralkyl, the substituents n are each independently of the others 0 or 1, preferably 1, the substituents q are each independently of the other 0, 1, 2, 3 or 4, preferably 0, 1 or 2, N represents a number from 0.1 to 30, preferably from 0.5 to 10, especially from 0.7 to 5, $R^5$ and $R^6$ are each independently of the other $C_1$–$C_4$-alkyl, preferably methyl, and Y represents $C_1$–$C_7$-alkylidene, $C_1$–$C_7$-alkylene, $C_5$–$C_{12}$-cycloalkylene, $C_5$–$C_{12}$-cycloalkylidene, —O—, —S—, —SO—, $SO_2$ or —CO—.

Special preference is given to compounds of the general formula (V) that are derived from bisphenol A or methyl-substituted derivatives thereof.

The phosphorus compounds according to component C, formula (IV) are known (see, for example, EP-A 363 608, EP-A 640 655) or can be prepared by known methods in an analogous manner (for example Ullmanns Encyklopädie der technischen Chemie, Vol. 18, p. 301 ff 1979; Houben-Weyl, Methoden der organischen Chemie, Vol. 12/1, p. 43; Beilstein Vol. 6, p. 177).

Other halogen-free phosphorus compounds may also be used as flameproofing component C, either alone or in any desired mixture with compounds of the general formula (IV). There are suitable as such halogen-free phosphorus compounds especially compounds from the group of the phosphazenes and phosphonate amines.

Phosphonate amines are compounds of formula (VI)

$$A_{3-y}\text{-NB}^1_y \quad \text{(VI)}$$

in which

A represents a radical of formula (VIa)

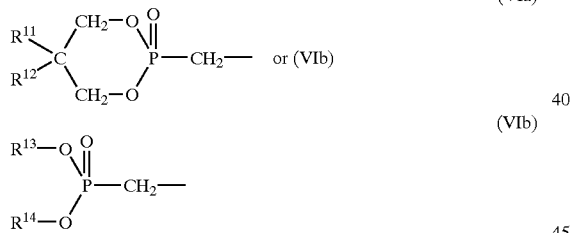

$R^{11}$ and $R^{12}$ are each independently of the other $C_1$–$C_{10}$-alkyl or unsubstituted or substituted $C_6$–$C_{10}$-aryl, $R^{13}$ and $R^{14}$ are each independently of the other $C_1$–$C_{10}$-alkyl or unsubstituted or substituted $C_6$–$C_{10}$-aryl, y represents the numerical values 0, 1 or 2, and the substituents $B^1$ are each independently hydrogen, $C_2$–$C_8$-alkyl, unsubstituted or substituted $C_6$–$C_{10}$-aryl.

The substituents $B^1$ are preferably each independently hydrogen, ethyl, n- or iso-propyl, unsubstituted or $C_1$–$C_4$-alkyl-substituted $C_6$–$C_{10}$-aryl, especially phenyl or naphthyl.

Alkyl in $R^{11}$, $R^{12}$, $R^{13}$ and $R^{14}$, each independently of the others, is preferably methyl, ethyl, n-propyl, isopropyl, n-, iso-, sec.- or tert.-butyl, pentyl or hexyl.

$C_6$–$C_{10}$-Aryl in $R^{11}$, $R^{12}$, $R^{13}$ and $R^{14}$, each independently of the others, is preferably phenyl, naphthyl or binaphthyl.

The following is mentioned by way of a preferred example: 5,5,5',5',5",5"-hexamethyltris(1,3,2-dioxaphosphorinane-methane)amino-2,2',2"-trioxide of formula (VIa-1)

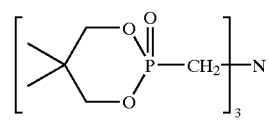

(test product XPM 1000 of Solutia Inc., St. Louis, USA).

The preparation of the phosphonate amines is described, for example, in U.S. Pat. No. 5,844,028.

Phosphazenes are compounds of formulae (VIIa) and (VIIb)

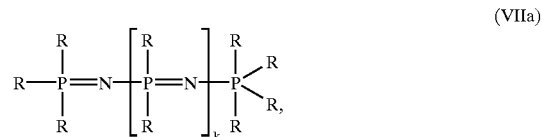

wherein the radicals R are each identical or different and represent $C_1$- to $C_8$-alkyl or $C_1$- to $C_8$-alkoxy, optionally alkyl-substituted, preferably $C_1$–$C_4$-alkyl-substituted, $C_5$- to $C_6$-cycloalkyl, $C_6$- to $C_{20}$-aryl, preferably phenyl or naphthyl, $C_6$- to $C_{20}$-aryloxy, preferably phenoxy, naphthyloxy, or $C_7$- to $C_{12}$-aralkyl, preferably phenyl-$C_1$–$C_4$-alkyl, k represents 0 or a number from 1 to 15, preferably a number from 1 to 10.

The following may be mentioned by way of examples: propoxyphosphazene, phenoxyphosphazene and methylphenoxyphosphazene.

Phenoxyphosphazene is preferred.

Phosphazenes and their preparation are described, for example, in EP-A 728 811, DE-A 1 961 668 and WO 97/40092.

Component D

The compositions according to the invention may contain fluorinated polyolefins as component D. The use of fluorinated polyolefins, especially in amounts of from 0.15 to 0.5 wt. %, is advantageous since, in the case of contents of <0.15 wt. %, a greater amount of flameproofing agent is required in order to achieve a V-0 rating in the UL94 V test. However, the increased amount of flameproofing agent has an adverse effect on melt stability, dimensional stability under heat and notched bar impact strength.

Fluorinated polyolefins are generally known (see, for example, EP-A 640 655). A commercially available product is, for example, Teflon® 30 N from DuPont.

The fluorinated polyolefins may also be used in the form of a coagulated mixture of emulsions of the fluorinated polyolefins with emulsions of the graft polymers (B) or with an emulsion of a copolymer preferably based on styrene/acrylonitrile, the fluorinated polyolefin in the form of an emulsion being mixed with an emulsion of the graft polymer or copolymer and subsequently coagulated.

The fluorinated polyolefins may also be used in the form of a pre-compound with the graft polymer (B) or with a copolymer preferably based on styrene/acrylonitrile. The fluorinated polyolefins are mixed in the form of a powder with a powder or granulate of the graft polymer or copolymer and are compounded in the melt generally at temperatures of from 200 to 330° C. in conventional apparatuses such as intimate kneaders, extruders or double-shaft screws.

The fluorinated polyolefins may also be used in the form of a masterbatch, which is prepared by emulsion polymerisation of at least one monoethylenically unsaturated monomer in the presence of an aqueous dispersion of the fluorinated polyolefin. Preferred monomer components are styrene, acrylonitrile and mixtures thereof. The polymer is used in the form of a pourable powder after acid precipitation and subsequent drying.

The coagulates, pre-compounds and masterbatches usually have solids contents of fluorinated polyolefin of from 5 to 95 wt. %, preferably from 7 to 60 wt. %.

Component E

Inorganic materials may also be added to the polycarbonate composition, especially inorganic materials that increase the melt stability owing to a thixotropic effect and/or that improve the flame resistance of the moulding composition. The inorganic materials are used in amounts that are as small but as effective as possible, which have a positive or at least do not have a negative effect on the mechanical properties of the material. There are suitable in principle all inorganic materials, preferably in the finely ground state. They may be, for example, of particulate, flake-like or fibrous nature. Examples which may be mentioned at this point are chalk, quartz powder, titanium dioxide, silicates/aluminosilicates, such as, for example, chalk, wollastonite, mica layered clay minerals, montmorillonite, especially also in an ion-exchange-modified, organophilic form, kaolin, zeolites, vermiculite as well as aluminium oxide, silica, magnesium hydroxide, aluminium hydroxide and glass fibres/glass flakes. Mixtures of different inorganic materials may also be used.

The inorganic materials may be surface-treated, for example silanised, in order to ensure better polymer compatibility.

The inorganic materials are used in concentrations of from 0 to 5 wt. %, preferably from 0 to 3 wt. %, especially from 0 to 1.5 wt. %, based on the total composition.

There are preferably used inorganic materials of flake-like nature, such as, for example, talc, mica/clay layered minerals, montmorillonite, especially also in an ion-exchange-modified, organophilic form, kaolin and vermiculite.

Talc is particularly preferred.

Talc is understood as being a naturally occurring or a synthetically prepared talc.

Pure talc has the chemical composition $3MgO \cdot 4SiO_2 \cdot H_2O$ and accordingly has an MgO content of 31.9 wt. %, an $SiO_2$ content of 63.4 wt. % and a content of chemically bonded water of 4.8 wt. %. It is a silicate having a layered structure.

Naturally occurring talc materials generally do not have the ideal composition mentioned above, since they are rendered impure by the partial replacement of the magnesium by other elements, by the partial replacement of silicon by, for example, aluminium, and/or by intergrowths with other minerals such as, for example, dolomite, magnesite and chlorite. Such contaminated natural talc powders may be used in the moulding compositions according to the invention, but preference is given to highly pure types of talc. Such types of talc are characterised by an MgO content of from 28 to 35 wt. %, preferably from 30 to 33 wt. %, particularly preferably from 30.5 to 32 wt. %, and an $SiO_2$ content of from 55 to 65 wt. %, preferably from 58 to 64 wt. %, particularly preferably from 60 to 62.5 wt. %. Preferred types of talc are further characterised by an $Al_2O_3$ content of less than 5 wt. %, particularly preferably less than 1 wt. %, more especially less than 0.7 wt. %.

The use of talc in the form of finely ground types having a mean largest particle size $d_{50}$ of <20 µm, preferably <10 µm, particularly preferably <5 µm, very particularly preferably ≦2.5 µm, is especially advantageous.

Further preferred inorganic components which may be mentioned are very finely divided (nano-scale) inorganic compounds of one or more metals of main groups 1 to and sub-groups 1 to 8 of the periodic system, preferably from main groups 2 to 5 and. sub-groups 4 to 8, particularly preferably from main groups 3 to 5 and sub-groups 4 to 8, with the elements oxygen, sulfur, boron, phosphorus, carbon, nitrogen, hydrogen and/or silicon.

Preferred compounds are, for example, oxides, hydroxides, water-containing/basic oxides, sulfates, sulfites, sulfides, carbonates, carbides, nitrates, nitrites, nitrides, borates, silicates, phosphates and hydrides.

Particularly preferred very finely divided inorganic compounds are, for example, TiN, $TiO_2$, $SnO_2$, WC, ZnO, $Al_2O_3$, AlO(OH), $ZrO_2$, $SiO_2$, iron oxides, $BaSO_4$, vanadium oxides, zinc borate, silicates such as Al silicates, Mg silicates. Mixtures and/or doped compounds may also be used. The nano-scale particles may be surface-modified with organic molecules.

Nano-scale AlO(OH) is especially preferred.

The average particle diameters of the nano-scale inorganic materials are less than or equal to 200 nm, preferably less than or equal to 150 nm, especially from 1 to 100 nm.

Particle size and particle diameter always mean the mean particle diameter $d_{50}$, determined by ultracentrifuge measurements according to W. Scholtan et al., Kolloid-Z. und Z. Polymere 250 (1972), p. 782 to 796.

The nano-scale inorganic compounds may be present in the form of powders, pastes, sols, dispersions or suspensions. Powders can be obtained from dispersions, sols or suspensions by precipitation.

Component F

The compositions according to the invention may also contain further polymers as component F.

There are suitable preferably vinyl (co)polymers (F.1) of at least one monomer from the group of the vinyl aromatic compounds, vinyl cyanides (unsaturated nitrites), (meth) acrylic acid ($C_1$–$C_8$)-alkyl esters, unsaturated carboxylic acids and derivatives (such as anhydrides and imides) of unsaturated carboxylic acids. There are especially suitable (co)polymers of F.1.1 from 50 to 99 parts by weight, preferably from 60 to 90 parts by weight, of vinyl aromatic compounds and/or vinyl aromatic compounds substituted at the nucleus (such as, for example and preferably, styrene, α-methylstyrene, p-methylstyrene) and/or methacrylic acid ($C_1$–$C_8$)-alkyl esters (such as, for example and preferably, methyl methacrylate, ethyl methacrylate), and F.1.2 from 1 to 50 parts by weight, preferably from 10 to 40 parts by weight, of vinyl cyanides (unsaturated nitrites), such as, for example and preferably, acrylonitrile and methacrylonitrile, and/or (meth)acrylic acid ($C_1$–$C_8$)-alkyl esters (such as, for example and preferably, methyl methacrylate, n-butyl acrylate, tert.-butyl acrylate) and/or unsaturated carboxylic acids (such as, for example and preferably, maleic acid)

and/or derivatives (such as, for example and preferably, anhydrides and imides) of unsaturated carboxylic acids (for example and preferably maleic anhydride and N-phenyl maleimide).

The (co)polymers F.1 are resin-like, thermoplastic and rubber-free.

Special preference is given to the copolymer of F.1.1 styrene and F.1.2 acrylonitrile.

The (co)polymers according to F.1 are known and can be prepared by free-radical polymerisation, especially by emulsion, suspension, solution or mass polymerisation. The (co)polymers according to component F.1 preferably have molecular weights $M_w$ (weight average, determined by light scattering or sedimentation) of from 15,000 to 200,000.

Also suitable are polyalkylene terephthalates (F.2) such as are described in EP-A-841 187.

Preference is given to polyalkylene terephthalates which have been prepared from terephthalic acid and/or reactive derivatives thereof (e.g. dialkyl esters thereof) and ethylene glycol and/or 1,4-butanediol, and mixtures of such polyalkylene terephthalates.

Component G

The moulding compositions according to the invention may contain further conventional additives, such as, for example, anti-dripping agents, lubricants and mould-release agents, nucleating agents, antistatics, stabilisers, colouring agents and pigments in an effective concentration.

The moulding compositions according to the invention containing components A–G and, optionally, further additives are prepared by mixing the respective constituents in a known manner and melt-compounding or melt-extruding them at temperatures of from 200° C. to 300° C. in conventional apparatuses such as intimate kneaders, extruders and double-shaft screws.

The individual constituents may be mixed in a known manner either in succession or simultaneously, either at approximately 20° C. (room temperature) or at a higher temperature.

Owing to their excellent flame resistance, their good mechanical properties and resistance to chemicals and owing to their high melt stability, the thermoplastic moulding compositions according to the invention are suitable especially for the production of sheets, profiles and moulded bodies by extrusion, extrusion blowing and deep drawing.

Examples of moulded bodies that can be produced are: covering plates, window/door profiles, as well as conduits/tubes for electrical installations, cable guides and ducts for wiring, conductor rail coverings as well as mouldings, extruded profiles or sheets for the motor vehicle/railway vehicle/aircraft sector (e.g. internal panelling) and the construction sector.

The invention relates also to processes for the preparation of the moulding compositions, to the use of the moulding compositions in the production of moulded bodies, sheets and profiles, and to the moulded bodies, sheets and profiles themselves.

EXAMPLES

Component A

Branched polycarbonate based on bisphenol A having a relative solution viscosity of 1.34 measured in methylene chloride at 25° C. and in a concentration of 0.5 g/100 ml.

Component B

Graft polymer, prepared by emulsion polymerisation, of 45 parts by weight of styrene and acrylonitrile in a ratio of 72:28 with 55 parts by weight of a particulate crosslinked polybutadiene rubber (mean particle diameter $d_{50}$=from 0.3 to 0.4 μm).

Component C.1
Bisphenol A-based oligophosphate

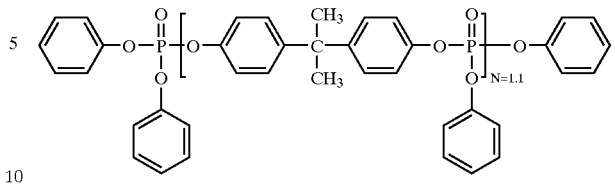

Component C.2
Resorcinol-based oligophosphate

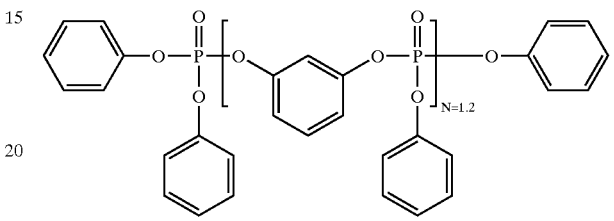

In order to determine the indicated number-averaged N values of components C.1 and C.2, the proportions of the oligomeric phosphates were first determined by HPLC measurements:

| | |
|---|---|
| column type: | LiChrosorp RP-8 |
| eluant in the gradient: | acetonitrile/water 50:50 to 100:0 |
| concentration: | 5 mg/ml |

The number-weighted average N values were then determined from the proportions of the individual components (mono- and oligo-phosphates) by known processes.

Component D

The polytetrafluoroethylene preparation (D) used is prepared by co-precipitation of a mixture of aqueous emulsions of the graft polymer (B) and of a tetrafluoroethylene polymer. The ratio by weight of graft polymer (B) to the tetrafluoroethylene polymer in the coagulate is 90 wt. % to 10 wt. %. The tetrafluoroethylene polymer emulsion has a solids content of 60 wt. %, and the mean PTFE particle diameter is from 0.05 to 0.5 μm. The graft polymer emulsion has a solids content of 34 wt. % and a mean latex particle diameter of from 0.3 to 0.4 μm.

For the preparation of (D), the emulsion of the tetrafluoroethylene polymer (Teflon 30 N from DuPont) is mixed with the emulsion of the graft polymer (B) and stabilised with 1.8 wt. %, based on polymer solid, of phenolic antioxidants. At from 85 to 95° C., the mixture is coagulated with an aqueous solution of $MgSO_4$ (Epsom salts) and acetic acid at pH 4 to 5, filtered and washed until virtually free of electrolyte, and is subsequently freed of the majority of the water by centrifugation and then dried to a powder at 100° C.

Component E

Pural 200: Nano-scale AlO(OH) having a boehmite structure from Condea Chemie GmbH (Hamburg, Germany).

Component G

Pentaerythritol Tetrastearate

Preparation and Testing of the Moulding Compositions According to the Invention

Components A to G were mixed in a 3 liter intimate kneader. The moulded bodies were produced on an injection-moulding machine (Arburg 270E) at 260° C.

The stress cracking behaviour is tested on rods measuring 80×10×4 mm. The test medium used is a mixture of 60 vol. % toluene and 40 vol. % isopropanol. The test specimens are pre-expanded by means of a circular arc template (pre-extension from 0.2 to 2.4%) and stored in the test medium at room temperature for 5 minutes. The stress cracking behaviour is assessed by means of the flexural elongation which at least is necessary for the rod to break within the 5-minute exposure time in the test medium.

The notched bar impact strength ($a_k$) is determined at room temperature according to ISO 180-1A.

The Vicat B 120 temperature is determined according to ISO 306 with a heating rate of 120 K/h and a die load of 50 N.

The flame resistance is determined in the UL94 V fire behaviour test on rods having a thickness of 1.5 mm.

The melt viscosity in the low shear range (shear rate of 100 $s^{-1}$) is determined as a measure of the melt stability in the case of extrusion processing according to DIN 54811 at 260° C.

The MVR (melt volume rate) is determined according to ISO 1133 at 260° C. using a die load of 5 kg.

A comparison of Examples 1 and 3 with Comparison Examples C1 to C7 shows that the addition of Teflon in concentrations >0.15 wt. %, based on the total composition, has a positive effect on the overall properties profile. For example, a comparison of Examples 2 and 3 with Comparison Examples C1 to C3 shows that, with the lower Teflon content of the Comparison Examples, adequate flameproofing can be achieved only by reducing the amount of graft polymer, increasing the amount of flameproofing agent and adding an inorganic material as flameproofing synergist. However, such measures for improving flameproofing have an adverse effect on ESC behaviour, notched bar impact strength, dimensional stability under heat and melt rheology. If the amount of graft polymer is increased accordingly to achieve high fracture toughness (Comparison Example C5), then adequate flame resistance cannot be achieved with the lower Teflon contents. A comparison of Comparison Examples C3 and C4 shows that, although the melt rheology and the flame resistance can be improved by the addition of inorganic materials, it is not possible to raise the notched bar impact strength and the stress cracking resistance to the required level.

TABLE 1

Composition and properties

| Example/ Components | | 1 | 2 | 3 | C1* | C2* | C3* | C4* | C5* | C7* |
|---|---|---|---|---|---|---|---|---|---|---|
| A | Polycarbonate | 85.0 | 84.0 | 84.0 | 86.2 | 86.2 | 85.3 | 86.0 | 84.3 | 86.4 |
| B | Graft polymer | 4.0 | 4.0 | 4.0 | 1.7 | 1.7 | 2.8 | 2.8 | 3.8 | 3.0 |
| C.1 | BDP | — | — | 8.0 | — | 9.5 | — | — | — | — |
| C.2 | RDP | 7.0 | 8.0 | — | 9.5 | — | 9.5 | 9.5 | 9.5 | 9.5 |
| D | PTFE preparation (10%) | 3.6 | 3.6 | 3.6 | 1.5 | 1.5 | 1.3 | 1.3 | 1.3 | — |
| E | Nano-scale AlO(OH) | — | — | — | 0.7 | 0.7 | 0.7 | — | 0.7 | 0.7 |
| G | PETS | 0.4 | 0.4 | 0.4 | 0.4 | 0.4 | 0.4 | 0.4 | 0.4 | 0.4 |
| Properties | | | | | | | | | | |
| ESC | Flexural elongation at break [%] | 1.8 | 1.8 | 2.2 | 1.2 | 1.2 | 1.0 | 1.0 | 1.0 | 1.2 |
| $a_k$ (23° C.) | [kJ/$m^2$] | 59 | 58 | 61 | 11 | 11 | 13 | 11 | 46 | 10 |
| Vicat B 120 | [° C.] | 116 | 112 | 119 | 110 | 114 | 108 | 107 | 107 | 109 |
| MVR [260° C./5 kg] | [ml/10 min] | 7.7 | 8.2 | 6.8 | 10.5 | 10.3 | n.b. | n.b. | n.b. | 11.0 |
| Melt viscosity [260° C., 100 $s^{-1}$] | [Pa s] | 1314 | 1123 | 1382 | 1028 | 1058 | 1185 | 800 | 1094 | 961 |
| UL94 V at 1.5 mm (afterburn time) | Rating [s] | V-0 (36) | V-0 (27) | V-0 (38) | V-0 (33) | V-1 (54) | V-0 (30) | V-2 (78) | V-1 (72) | V-2 (59) |

*comparison test

Examples 1 to 3 in Table 1 fully meet the required properties profile of
 a) excellent flame resistance (UL 94 V-0 rating at 1.5 mm wall thickness),
 b) excellent level of notched bar impact strength,
 c) improved dimensional stability under heat and, especially,
 d) markedly improved ESC behaviour.

Owing to their good melt stability (high melt viscosity, low MVR) they are ideally suited to processing by extrusion.

Table 1 shows that products according to the invention containing bisphenol A-based oligophosphates as flameproofing agent exhibit marked property advantages as compared with comparable products containing resorcinol-based oligophosphates in respect of ESC behaviour, notched bar impact strength, dimensional stability under heat and melt rheology (see Examples 2 and 3).

What is claimed is:
1. A molding composition consisting of
 (i) at least one branched or linear polycarbonate derived from at least one compound selected from a the group consisting of: resorcinol, dihydroxydiphenols, bis-(hydroxyphenyl)-$C_1$–$C_5$-alkanes, bis-(hydroxyphenyl)-$C_5$–$C_6$-cycloalkanes, bis-(hydroxyphenyl) ethers, bis-(hydroxyphenyl) sulfoxides, bis-(hydroxyphenyl) ketones, bis-(hydroxyphenyl)-sulfones and α,α-bis-(hydroxyphenyl)-diisopropyl-benzenes, said polycarbonate having relative solution viscosity ≧1.30 (measured at 25° C. in methylene chloride and in a concentration of 0.5 g/100 ml),
 (ii) at least one impact modifier,
 (iii) at least one halogen-free phosphorus-containing flameproofing agent selected from the second group consisting of compounds conforming to (A) and (B) wherein

(A) is

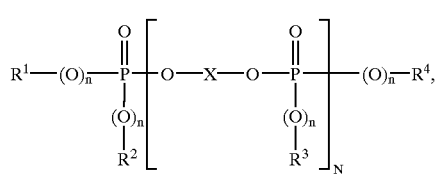

and (B) is

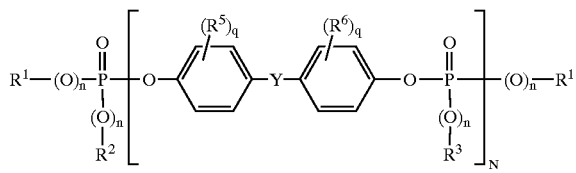

wherein $R^1$, $R^2$, $R^3$ and $R^4$ are each independently of the others $C_1$- to $C_8$-alkyl, or $C_5$- to $C_6$-cycloalkyl, $C_6$- to $C_{20}$-aryl or $C_7$- to $C_{12}$-aralky each optionally substituted by alkyl, n are each independently of the others 0 or 1, N represents a number from 0.7 to 5, X represents a mono- or poly-nuclear aromatic radical having from 6 to 30 carbon atoms, or linear or branched aliphatic radical having from 2 to 30 carbon atoms which may be OH-substituted and contain up to 8 ether bonds, q independently one of the others denotes 0,1, 2, 3 or 4, $R^5$ and $R^6$ independently one of the other denote $C_1C_4$-alkyl, and Y represents $C_1$–$C_7$-alkylidene, $C_1$–$C_7$-alkylene, $C_5$–$C_{12}$-cycloalkyl $C_5$–$C_{12}$-cycloalkylidene, —O—, —S—, —SO—, $SO_2$ or —CO—, and optionally (iv) one or more members selected from the third group consisting of anti-dripping agent, lubricant and mold-release agent, nucleating agent, antistatic, stabilizer, coloring agent and pigment, said composition characterized in its UL 94 V-0 flammability rating at wall thicknesses $\leq 1.5$ mm and a melt viscosity, measured at 260° C. and a shear rate of 100 $s^{-1}$, of $\geq 600$ Pa s.

2. The molding composition according to claim 1 wherein the flameproofing agent conforms to 3. The molding composition of claim 1 wherein the anti dripping agent is present in an amount of 0.15 to 1 wt. % based on the total composition.

4. The molding composition of claim 3 wherein the anti dripping agent is fluorinated polyolefin, optionally in the form of a coagulate, a pre-compound or a masterbatch with a graft polymer or a vinyl (co)polymer.

5. The molding composition of claim 1 wherein the anti dripping agent is present in an amount of 0.2 to 0.5 wt. % based on the total composition.

6. Moulding compositions according to claim 1 wherein the impact modifier is one or more graft polymers of from 5 to 95 wt. % of at least one vinyl monomer with from 95 to 5 wt. % of at least one graft base having a glass transition temperature <10° C.

7. Moulding compositions according to claim 6 containing graft polymers based on diene, EP(D)M, acrylate or silicone rubbers.

8. The molding composition of claim 6 wherein the graft polymer is an emulsion or mass ABS or mixtures thereof.

9. The molding composition of claim 1 wherein the polycarbonate is branched.

10. The molding composition of claim 4 wherein the polycarbonate is present in an amount of 60 to 98 wt. %, the impact modifier is present in an amount of 0.5 to 30 wt. %, the flameproofing agent is present in an amount of 1 to 20 wt. %, and the fluorinated polyolefin is present in an amount of 0.15 to 1 wt. % the sum of the wt. % of the components being 100.

11. The molding composition of claim 4 wherein the polycarbonate is present in an amount of 75 to 90 wt. %, the impact modifier is present in an amount of 2 to 10 wt. %, the flameproofing agent is present in an amount of 3 to 12 wt. %, and the fluorinated polyolefin is present in a amount of 0.2 to 0.5 wt. % the sum of the wt. % of the components being 100.

12. Process for the preparation of the moulding compositions according to claim 1, wherein the individual components are mixed and compounded at 200 to 300° C.

13. Moulded bodies or mouldings as well as profiles, sheets, tubes and conduits for electrical installations obtainable from the moulding compositions according to claim 1.

* * * * *